United States Patent [19]

Mangahara et al.

[11] Patent Number: 6,048,372
[45] Date of Patent: Apr. 11, 2000

[54] METHOD OF PRODUCING AN ELECTRODE PLATE USED FOR A LITHIUM SECONDARY BATTERY AND A LITHIUM SECONDARY BATTERY

[75] Inventors: Toru Mangahara; Satoshi Tanno; Akira Takamuku; Masahiro Yamamoto; Tomoki Kourakata; Hiroki Ohto, all of Iwaki, Japan

[73] Assignee: Furukawa Denchi Kabushiki Kaisha, Yokohama, Japan

[21] Appl. No.: 09/158,988

[22] Filed: Sep. 23, 1998

[30] Foreign Application Priority Data

Sep. 29, 1997 [JP] Japan ................................. 9-281361

[51] Int. Cl.⁷ ............................. H01M 4/26; H01M 4/30; H01M 4/62
[52] U.S. Cl. .................... 29/623.5; 429/212; 429/231.9; 429/245; 429/248
[58] Field of Search ........................... 29/623.5; 429/215, 429/231.95

[56] References Cited

U.S. PATENT DOCUMENTS

| | | | |
|---|---|---|---|
| 4,004,944 | 1/1977 | Sandera | 429/215 |
| 4,017,665 | 4/1977 | Sandera et al. | 429/229 |
| 4,431,686 | 2/1984 | Bewer | 427/125 |

FOREIGN PATENT DOCUMENTS

| | | | |
|---|---|---|---|
| 0822606 A1 | 7/1997 | European Pat. Off. | H01M 4/24 |
| 0 822 606 | 2/1998 | European Pat. Off. | |
| 4-249860 | 9/1992 | Japan | |
| 5-182692 | 7/1993 | Japan | |
| 5-290836 | 11/1993 | Japan | |
| 5-290837 | 11/1993 | Japan | |

OTHER PUBLICATIONS

Patent Abstr. of Japan, No. 08064245, Publ. Mar. 1996 (Fuji Photo Film Co. Ltd.).
Patent Abstr. of Japan, No. 09180703, Publ. Jul. 1997 (Fuji Photo Film Co. Ltd.).
Patent Abstr. of Japan, No. 09180758, Publ. Jul. 1997 (Fuji Photo Film Co. Ltd.).
Patent Abstr. of Japan, No. 09190820, Publ. Jul. 1997 (Fuji Photo Film Co. Ltd.).
Chemical Abstracts, vol. 127, No. 10, Sep. 1997 (Abstract No. 138107).
Chemical Abstracts, vol. 129, Sep. 1998 (Abstract No. 233113).

*Primary Examiner*—Maria Nuzzolillo
*Assistant Examiner*—Mark Ruthkosky
*Attorney, Agent, or Firm*—Armstrong, Westerman, McLeland, Hattori & Naughton

[57] ABSTRACT

A method of producing an electrode plate used for a lithium secondary battery and a lithium secondary battery containing such an electrode plate. The electrode plate is produced by coating a coating slurry of an active material mixture agent added with oxalic acid on a collector, drying and pressing, so as to obtain an electrode plate improved in charge-discharge cycle characteristics when used in a lithium secondary battery.

2 Claims, No Drawings

METHOD OF PRODUCING AN ELECTRODE PLATE USED FOR A LITHIUM SECONDARY BATTERY AND A LITHIUM SECONDARY BATTERY

FIELD OF THE INVENTION

The subject invention relates to a method of producing an electrode plate used for a lithium secondary battery and a lithium secondary battery containing such an electrode plate.

BACKGROUND OF THE INVENTION

With recent rapid progress in the field of the electric and electronic industries, electric and electronic devices have been made higher in performance, smaller in size and portable. With such developments of these devices, there has been an increased requirement for secondary batteries which are capable of recharging and have a high energy density so as to be adaptable for use in these electronic devices.

As for the conventional secondary batteries used for these electronic devices, lead acid batteries, nickel-cadmium batteries and nickel-hydrogen batteries are enumerated. However, a battery which has a higher energy density than these has been required. Recently, lithium secondary batteries comprising the combination of (1) a negative electrode using a metallic lithium, a lithium alloy, a carbon material or the like capable of electro-chemically occluding and releasing lithium ions as an active material for the negative electrode and (2) a positive electrode using a lithium-contained complex oxide, a chalcogen compound or the like as an active material for the positive electrode have been researched, developed and partly put to practical use. This type of battery is high in battery voltage and larger in energy density per weight and volume as compared with the above-mentioned other types of conventional batteries, and is a most promising secondary battery for the future.

Either a positive electrode plate or a negative electrode plate to be used for this kind of battery is produced by a method wherein a binder, an electric conductive agent, etc. are added to and mixed with an active material thereof, and an active material mixture agent thus obtained is mixed in a dispersing agent to prepare a coating slurry of the active material mixture agent, and the coating slurry thus obtained is coated on a collector, dried and pressed. Improving the characteristics of the battery depends not only on the selection of such materials as active materials, to start with, binders added therein and dispersing agents etc., but also on how to produce a good electrode by using the selected materials. Above all, if the adhesion between the active material mixture agent and the electric collector is insufficient, degradation of a cycle characteristics of a battery or the like result, even if good materials are selected. Accordingly, to improve the adhesion, examination of most suitable selection of kinds of the binders and the optimum addition amount of the binders, examination of the drying conditions for removing the dispersing agents and other various examinations have been carried out. (See publications of JP-A 4249860, JP-A 5290836, JP-A 5290837 and JP-A 5182692)

However, the positive electrode and the negative electrode produced by the above mentioned conventional techniques involve such inconveniences that the battery characteristics of the lithium secondary batteries, especially the charge-discharge cycle characteristics cannot be sufficiently obtained, and a quick decrease of the battery capacity results. One of the causes thereof is considered to be the insufficient adhesion between the active material mixture agent and the collector.

Accordingly, in view of the above-mentioned inconveniences, the development of a method of producing an electrode which improves of the adhesion between the active material mixture agent and the collector and also improves of the charge-discharge cycle characteristics of a lithium secondary battery is desired.

SUMMARY OF THE INVENTION

According to the present invention, a means to solve the above-mentioned problems and to achieve the above-mentioned object is achieved by a method of producing an electrode plate used for a lithium secondary battery in which a coating slurry of an active material mixture agent is coated on a collector and is pressed, an improvement being that oxalic acid is added and mixed in the process of preparing the coating slurry of the active material mixture agent and is pressed, and the coating slurry of the active material mixture agent containing the oxalic acid is coated on the collector.

Further, a preferable method of producing a lithium secondary battery according to the present invention is where the addition amount of the oxalic acid is 0.05–10 wt. % based on the amount of the active material mixture agent.

Furthermore, another object of the present invention is to provide a lithium secondary battery which is improved in the charge-discharge cycle characteristics, and contains the positive or/and the negative electrode produced by the above-mentioned method according to the present invention.

DESCRIPTION OF THE PREFERRED EMBODIMENTS

Next, a mode for carrying out the invention will be described in detail.

A method of producing a positive electrode or a negative electrode to be used for a lithium secondary battery is carried out either by such steps of adding at least a binder as an additive to an active material for a positive electrode or an active material for a negative electrode, if necessary, further adding an electric conductive agent, mixing them to make an active material mixture agent and adding a dispersing agent to the active material mixture agent to prepare a coating slurry thereof, coating the coating slurry on a collector, drying and pressing, or by such steps of adding the active material for the positive electrode or the active material for the negative electrode to the binder previously dissolved in the dispersing agent, if necessary, further adding the electric conductive agent thereto, mixing to prepare a coating slurry of the active material mixture agent, coating the coating slurry on the current collector, drying and pressing. As for the collector, a non-punched metallic plate, a two-dimensional structural metallic porous plate such as a punched metallic plate etc. and a three-dimensional structural metallic porous plate such as a foamed metallic plate etc., may be used. When the coating slurry is coated on the collector, the coating state is varied with the different types of the collector. More in detail, when the coating slurry is coated on a non-punched plate, a coating layer of the coating slurry is formed on the surface thereof, and when it is coated on a two or three dimensional porous plate, the coating slurry is filled in innumerable punched holes or pores thereof in addition a coating layer being formed on the surface thereof.

According the present invention, oxalic acid is added in the preparation of the above-mentioned coating slurry of the active material mixture agent, and then the coating slurry of the active material mixture agent containing the oxalic acid is coated on the collector. The oxalic acid may be added in the form of powder. As for the time of the addition of the oxalic acid; it may be added simultaneously with mixing of the active material and the binder or it may be added to the active material mixture agent after it is prepared. The addition amount thereof is, as is clarified later, preferably in the range of 0.05–10 wt. % based on the weight of the active material mixture agent. The optimum addition is in the range of 0.1–5 wt. %. Here, the phrase "active material mixture agent" includes a mixture of an active material and a binder, and also a mixture in which at least one kind of an electric conductive agent and/or other additives are added to the foregoing mixture of the active material and the binder. The active material, the electric conductive agent and the binder are selected from respective types listed later.

It has been found that the electrode plate of the present invention prepared by using the coating slurry of the active material mixture agent containing oxalic acid has remarkably improved adhesion between the active material mixture agent and the collector. Accordingly, a lithium secondary battery using the electrode of the present invention as the positive electrode or the negative electrode has a lowered decreasing rate of the battery capacity involved by the charge-discharge cycles and is improved in the cycle characteristics of the battery, as compared with the conventional electrode plate produced by using a coating slurry of active material mixture agent not containing oxalic acid.

The particular reasons for improvement thereof are not clear at present, but, it is believed that it is due to an anchoring effect of the active material mixture agent onto the surface of the collector caused by the addition of the oxalic acid.

As suitable active materials for the positive electrode, such are not limited as long as they are compounds which are capable of electro-chemically occluding and releasing lithium such as lithium-containing complex oxides including, for example, $LiCoO_2$, $LiNiO_2$, $LiMnO_2$, $LiMn_2O_4$, etc., or chalcogen compounds or the like including, for example, $TiO_2$, $MnO_2$, $MoO_3$, $V_2O_5$, $TiS_2$, $MoS_2$, etc. However, for obtaining a high discharging voltage, lithium-containing complex oxides which have a $NaCrO_2$ structure such as $LiCoO_2$, $LiNiO_2$, $LiMnO_2$, etc., or $LiMn_2O_4$ preferably are used.

Further, as suitable active materials for the negative electrode, such are not limited as long as they are carbon materials capable of electro-chemically occluding and releasing lithium such as a natural graphite, an artificial graphite, a hard graphitized carbon etc., lithium alloys such as a lithium-aluminum alloy, a lithium-zinc alloy, a lithium-antimony alloy, a lithium-Wood's metal, etc., metallic lithium, or amorphous tin oxides, etc. However for obtaining a high cycle characteristics, carbon materials capable of electro-chemically occluding and releasing lithium such as a natural graphite, an artificial graphite, a hard graphitized carbon, etc., preferably are used.

As for suitable binders to be added to the above-mentioned active materials, the binder may be selected from thermoplastic resins, thermosetting resins, ionizing radiation setting resins, etc. Further, for example, preferably used are electron beam reactive binders prepared by physically mixing or chemically introducing compounds containing a functional group or groups reactive with electron beams with synthetic resin binders. For instance, a binder may be used which is prepared by mixing physically or chemically combined at least one kind of compounds (monomer or oligomer) which contain a functional groups which are reactive by means of electron beams with at least one kind of a thermoplastic resin, such as, for example, polyester resin, polyamide resin, polyimide resin, poly acrylic ester resin, polycarbonate resin, polyurethane resin, cellulose resin, polyolefin resin, polyvinyl resin, fluorine-containing polymer, alkyl resin, NBR, etc.

As for the above-mentioned compounds containing a functional group or groups reactive with the electron beams, there may be enumerated monomers or oligomers of compounds which have an acrylic group, vinyl group, allyl group, etc. Preferably used are monomers, prepolymers or oligomers of (meta) acrylate, urethane (meta) acrylate, epoxy (meta) acrylate, polyester (meta) acrylate, (meta) acrylic phosphorous compound etc., or a combination of single or plural number of the monofunctional or/and multifunctional monomer of styrene, (meta) methyl acrylate, (meta) butyl acrylate, 2-hydroxy ethyl acrylate, ethylene glycol diacrylate, diethylene glycol diacrylate, hexamethylene glycol diacrylate, neopentyl glycol diarcylate, ethylene glycol diglycidyl acrylate, diethylene glycol diglycidyl ether diacrylate, hexamethylene glycol diglycidyl ether diacrylate, neopentyl glycol diglycidyl ether diacrylate, trimethlol propane triacrylate, penta erythritol tetraacrylate, dipenta erythritol tetraacrylate, or dipenta erythritol hexaacrylate. It is preferable that the amount of the foregoing compounds having the foregoing functional groups is 1–80 wt. % of the total binder, that is, 1–80 wt. % to 99–20 wt. % of the synthetic resin binder.

Further as the binders which are reactive to an electron beam, there may also be used one that is prepared by a compound (monomer or oligomer) having a functional group which is reactive to the electron beam is chemically introduced (chemically bonded with) in the binder selected from the thermoplastic resins listed above. One example of producing such a binder is that a hydroxyl group or a carboxyl group in the thermoplastic resin and the monomer or the oligomer of acrylate, etc., having the hydroxyl group, are coupled with one another through a diisocyanate. More in detail, for example, the monomers or the oligomers of acrylate compounds such as 2-hydroxyethyl acrylate, 2-hydroxymethyl (meta) acrylate, 2-hydroxy-3-phenoxy propyl (meta) acrylate etc., can be chemically introduced through any isocyanates such as toluidine isocyanate, 4,4'-diphenyl methane diisocyanate, isophorone diisocyanate, hexa methylene diisocyanate, xylene diisocyanate etc. The amount introduced may be in the same ratio as the case of mixing. One of the forgoing monomers or oligomers of acrylate or a mixture of the oligomer and the monomer thereof can be used as the binder.

Next, the active material mixture agent is prepared by mixing an active material for the positive electrode material or an active material for the negative electrode with a binder. The mixing ratio thereof is preferably where the active material is 60–95 wt. % and the binder is 40–5 wt. %. An optimum range is where the active material is 70–90 wt. % and the binder is 30–10 wt. %. The monomer or the oligomer which is a compound containing the functional group which is reactive with the electron beam is not included in the binder thereof. When the monomer or the oligomer, which is the compound containing the functional group which is reactive with the electron beam, is mixed or introduced in the binder, if the binder is diluted by the monomer or the oligomer to a proper coating viscosity, for example, of 1000–10,000 cps, the active material mixture agent is coated on a collector as it is. If the active material mixture agent is not of a suitable viscosity for coating, a appropriate quantity of various kinds of organic solvents may be added thereto as a dispersing agent. The organic solvent may be selected from aromatic solvents such as toluene, etc., ketone solvents, ester or ether solvents, or solvents such as amide, etc.

Further, an electric conductive agent may be added to the active material mixture agent as desired, the addition amount thereof being 0.1–10 wt. % based on the active material. As for the conductive agent, there are metallic powders such as Ni powder or carbon powder, etc., but carbon material such as graphite, carbon black, acetylene black, etc., is preferable in general.

Thus, the active material mixture agent is prepared by mixing active material powder for the positive electrode or active material powder for the negative electrode and a binder, which is a common binder or a binder having the electron beam reactive property prepared by adding physically or chemically to the above-mentioned compound which is reactive to the electron beam, in the above-mentioned mixing ratio. The agent is used as it is as a coating slurry or, if necessary, the agent is added with a dispersing agent to adjust the coating viscosity to 5000 cps and then used as a coating slurry. Further, if desired, the active material mixture agent is added with the above-mentioned amount of the electric conductive agent powder and is mixed uniformly by a mixer such as a homogenizer, a ball mill, sand mill, roll mill or the like. Thereafter, according to the present invention, oxalic acid is added to the active material mixture agent in the range of 0.05–10 wt. %, preferably, 0.1–5 wt. %, based on the active material mixture agent (the active material+the binder), and is mixed further to obtain a coating slurry of the active material mixture agent containing oxalic acid according to the present invention.

Next, the coating slurry of the active material mixture agent for the positive electrode or of the active material mixture agent for the negative electrode of the present invention thus obtained is coated uniformly on the collector, for example, made of metallic foil, using a coating method selected from gravure coating, gravure reverse coating, roll coating, Mayer bar coating, blade coating, knife coating, air knife coating, comma coating, slot die coating, slide die coating, dip coating, etc., so that the thickness of the dried coat may be in the range of 10–250 μm, preferably, 50–200 μm. Immediately after coating or after drying of the coat as desired, it is subjected to a press treatment under a pressure application condition of 500–7500 Kgf/cm$^2$ using a metal roll, heat roll, sheet press machine, etc., and thereby the positive electrode plate or the negative electrode plate of the present invention is obtained. Thus, a coating layer which is uniform in quality is obtained on the upper side of the collector. As for the pressure conditions, it is difficult to obtain homogeneity of the coating layer at a pressure lower than 500 Kgf/cm$^2$ and the electrode itself including the metal foil substrate may be damaged at a pressure higher than 7500 Kgf/cm$^2$. Especially, a pressure application condition in the range of 3000–5000 Kgf/cm$^2$ is preferable.

Further, in order to obtain lithium secondary batteries according to the present invention using the positive electrode plate or/and negative electrode plate of the present invention produced as above, an electrode plate group is made by stacking negative electrodes plate or/and positive electrode plates one after another with a separator interposed between them and the electrode plate group is placed in a battery container. Therefore, a nonaqueous electrolyte is poured therein, and the container is applied with a cover and sealed, so that the lithium secondary batteries of the present invention are obtained. Among these batteries, there are included lithium secondary batteries of the present invention comprising the electrode plate groups in which, if either one of the positive electrode plate and the negative electrode plate thereof is an electrode plate of the present invention, the other electrode plate of the opposite polarity is of any type of conventional electrode plate.

The non-aqueous electrolyte is not limited as far as it can be used for lithium secondary batteries. As examples, there may be enumerated some examples which are prepared by dissolving at least one kind of solute selected from inorganic lithium salts such as $LiClO_4$, $LiBF_4$, $LiPF_6$, $LiAsF_6$, $LiCl$, $LiBr$, etc., and organic lithium salts such as $LiB(C_6H_5)_4$, $LiN(SO_2CF_3)_2$, $LiC(SO_2CF_3)_3$, $LiOSO_2 CF_3$), etc. in at least one kind of solvent selected from cyclic esters such as propylene carbonate, ethylene carbonate, butylene carbonate, γ-butyrolactone, vinylene carbonate, 2-methyl-γ-butyrolactone, acetyl-γ-butyrolactone, γ-valerolactone, etc., cyclic ethers such as tetrahydrofuran, alkyl tetrahydrofuran, dialkyl tetrahydrofuran, alkoxy tetrahydrofuran, dialkoxy tetrahydrofuran, 1,3-dioxolane, alkyl-1,3-dioxolane, 1,4-dioxolane, etc., chain ethers such as 1,2-dimethoxyethane, 1,2-diethoxyethane, diethyl ether, ethylene glycol dialkyl ether, diethylene glycol dialkyl ether, triethylene glycol dialkyl ether, tetraethylene glycol dialkyl ether, etc. and chain esters such as dimethyl carbonate, methyl ethyl carbonate, diethyl carbonate, alkyl propionate ester, dialkyl malonate ester, alkyl acetate ester etc. Especially, those electrolytes prepared by dissolving $LiBF_4$ or $LiPF_6$ or a mixture of these in a mixture solvent in which at least one kind selected from propylene carbonate and ethylene carbonate and at least one kind selected from ethyl methyl carbonate, diethyl carbonate and dimethyl carbonate are preferable.

Furthermore, the separator is not limited as long as it is insoluble to the components of the foregoing electrolytes. Monolayer or multilayer microporous-films of polyolefins such as polypropylene, polyethylene, etc., are especially preferable.

Next, it will be clarified from the comparison tests described below that the electrode plates of the present invention produced by using the active material mixture agent containing oxalic acid are remarkably improved in adhesion according to a peeling test for evaluating the adhesion between the active material mixture agent and the collector and that the plates are remarkably improved in cycle characteristics when in a lithium secondary battery as compared with a conventional electrode plate produced by using the same active material mixture agent which does not have added oxalic acid.

(1) Method of Producing a Conventional Positive Electrode Plate:

(a) Preparing a coating slurry of an active material mixture agent for a positive electrode:

A coating slurry of the active material mixture agent for the positive electrode was prepared by blending 90 wt. parts $LiCoO_2$ powder with 1–100 μm in grain diameter as the active material for the positive electrode, 4 wt. parts polyvinylidene fluoride resin (NeofleonVDF VP-850 made by Daikin Kogyo Kabushiki Kaisha) as a binder, 5.0 wt. parts graphite powder as an electric conductive agent and 20 wt. parts N-methyl pyrrolidone as a dispersing agent and then the slurry was mixed by stirring for mixing them with a disperser at 8000 r.p.m. for 20 minutes.

(b) Producing a positive electrode plate:

Next, the above-mentioned coating slurry of the active material mixture agent for the positive electrode was continuously coated using a die coater, on one side of a collector made of 20 μm thick aluminum foil to form a coating with a width of 300 mm, and after being dried at 70° C., the coating was dried in an oven at 135° C. for 2 minutes, and then further dried in an oven at 140° C. for 2 minutes to remove the dispersing agent. Thereby, a 180 μm thick coating layer of the active material mixture agent for the positive electrode was formed on the collector, and thereafter the layer was pressed at 500 Kgf/cm² to produce a positive electrode plate.

(2) Method of Producing a Conventional Negative Electrode Plate:

(a) Preparing a coating slurry of an active material mixture agent for a negative electrode:

A coating slurry of an active material mixture agent for the negative electrode was prepared by blending 85 wt. parts graphite powder as the active material for the negative electrode, 10 wt. parts polyvinylidene fluoride resin (NeofleonVDF VP-850 made by Daikin Kogyo Kabushiki Kaisha) as a binder, 3 wt. parts Kayarad R-167 (made by Nihon Kayaku Kabushiki Kaisha) which is acrylate monomer as a compound reactive with an electron beam and 225 wt. parts N-methyl pyrrolidone as a dispersing agent and then the slurry was mixed by stirring with a disperser at 8000 r.p.m. for 20 minutes.

(b) Producing a negative electrode plate:

Next, the above-mentioned coating slurry of the active material mixture agent for the negative electrode was continuously coated using a die coater, to form a coating with a width of 300 mm on one side of a collector made of 15 μm thick copper foil, and after being dried at 100° C., a 190 μm thick coating layer of the active material mixture agent of the positive electrode was formed on the collector. The dried coating was irradiated with electron beams to be harden the coating, and it was then pressed at 500 Kgf/cm² to produce a negative electrode plate.

(3) Method of Producing a Positive Electrode Plate of the Present Invention:

To the active material mixture agent for the positive electrode described in the foregoing section (1)(a), was added respectively with the respective amounts of 0.05 wt. %, 0.1 wt. %, 3 wt %, 10 wt. % and 12 wt. % of oxalic acid as shown in Table 1 below. Thereafter, these five samples of active material mixture agents for the positive electrode were stirred and mixed in the same manner as the foregoing section (1)(a), so that respective coating slurries for the active material mixture agent for the positive electrode containing the respective amounts of oxalic acid were prepared. Next, the respective coating slurries of the active material mixture agents for the positive electrodes containing oxalic acid were treated under the same conditions as the foregoing section (1)(b), so that five different positive electrode plates according to the present invention were produced.

(4) Method of Producing a Negative Electrode Plate of the Present Invention:

To the active material mixture agent for the negative electrode described in the foregoing section (2)(a), was added respectively with the respective amounts of 0.05 wt. %, 0.1 wt. %, 3 wt. %, 10 wt. % and 12 wt. % of oxalic acid as shown in Table 1 below. Thereafter, these five samples of the active material mixture agents for the negative electrodes were stirred and mixed in the same manner as the foregoing section (2)(a), so that respective coating slurries of the active material mixture agent for the negative electrodes containing the respective amounts of oxalic acid were prepared. Next, the respective coating slurries for the active material mixture agents containing the respective amounts of oxalic acid for the negative electrodes were treated under the same conditions as the foregoing section (2)(b), so that five different negative electrode plates according to the present invention were produced.

Evaluation of Adhesion (Tape Peeling Test):

As for the positive and negative electrode plates produced by the foregoing conventional method and the positive and negative electrode plates of the present invention produced by the foregoing methods, the adhesion of each was evaluated by the following method. That is, a test piece of a 10 cm square size was cut out from each of the electrode plates, and 11 (eleven) score lines were made in the test piece at spaces of 1 mm both vertically and horizontally so as to cut the coating layer of the active material mixture agent so that 100 divisional areas, each of 1 mm square size, were formed in coating layer test piece. Thereafter, a synthetic adhesive tape was adhered by pressure to the each test piece and the tape was then peeled off, the adhering and peeling of the adhesive tape being repeated five times. Thereafter, the adhesion of the each test piece was evaluated by counting the number of the divisional areas in which the layer of the active material mixture agent remained on the test piece at the time of the fifth peeling. The results of this test also are shown in Table 1 below.

TABLE 1

|  | Addition amount of oxalic acid (wt. %) | Peeling test |
| --- | --- | --- |
| Conventional positive electrode plate | — | 83 |
| Positive electrode plate of the present invention | 0.05 | 99 |
| Positive electrode plate of the present invention | 0.1 | 97 |
| Positive electrode plate of the present invention | 3 | 100 |
| Positive electrode plate of the present invention | 10 | 99 |
| Positive electrode plate of the present invention | 12 | 100 |
| Conventional negative electrode plate | — | 62 |
| Negative electrode plate of the present invention | 0.05 | 98 |
| Negative electrode plate of the present invention | 0.1 | 98 |
| Negative electrode plate of the present invention | 3 | 97 |
| Negative electrode plate of the present invention | 10 | 99 |
| Negative electrode plate of the present invention | 12 | 100 |

As it is apparent from the results of the adhesion comparison shown in Table 1, only 83 divisional areas and 62 divisional areas remained respectively in the conventional positive and negative electrodes. In contrast thereto, at least 97 divisional areas remained in respect with the positive electrodes and negative electrodes of the present invention. Thus, these test results demonstrate that the adhesion of the electrodes with added oxalic acid is superior.

Production of a Conventional Lithium Secondary Battery (Sample No. 1)

Using the positive electrode and the negative electrode produced in the above-mentioned sections (1) and (2), those positive and negative electrodes were stacked one on another separated by a separator, which was wider than the positive and negative electrodes and had a three dimensional structural mircroporous-film of polyolefin selected from polypropylene, polyethylene or copolymer of both of them. The resultant stack was wound to make a spiral electrode plate group, and the electrode plate group was placed in a cylindrical and bottomed stainless steel battery container which serves as a negative electrode terminal, and a cover was applied thereto. Thus, an AA sized battery with a rated capacity of 500 mAh was fabricated. The battery was then placed in a vacuum oven at 60° C. and aged for 48 hours to remove water and was dried. After drying, a given amount of an organic solvent was prepared by dissolving hexafluoro lithium phosphate in a mixture solvent of ethylene carbonate and dimethyl carbonate in a mixture ratio of 1 to 1 by weight so as to be 1 mol/l. The solvent was poured in the battery through a filling opening made in cover and then the opening was sealed, so that 10 cells of cylindrical lithium secondary batteries indicated as sample No. 1 in Table 2 below were obtained.

Production of Lithium Secondary Batteries (Samples No. 2–No. 36) of the Present Invention Using the 5 samples of positive electrode plates of the present invention and the 5 samples of negative electrode plates of the present invention produced by the foregoing methods of sections (3) and (4), these electrodes plates were matched with conventional negative electrode plates and the conventional positive electrode plates produced by the foregoing conventional methods of sections (2) and (1) as the opposite electrode and that the 5 kinds of the positive electrode plates and the 5 kinds of the negative electrode plates of the present invention were matched one with another, to produce ten cells of cylindrical lithium secondary batteries indicated as samples No. 2–No. 36 shown in Table 2 by the same producing method as the conventional cylindrical secondary batteries mentioned above.

Charge-discharge cycle characteristics tests were carried out for the battery samples No. 1–No. 36 using a charge-discharge measuring device at a temperature of 25° C. That is, each battery sample was subjected to a charge-discharge cycle where the battery was charged with the maximum charging current value of 0.2 mCA until the battery voltage became 4.1 V, and after resting for 10 minutes, it was discharged with the same current until it became 2.75 V, and after resting for 10 minutes, the above-mentioned charging was carried out again. This charging-discharging was repeated for 100th cycles and the capacity of each battery was measured at the 1st cycle, the 30th cycle and 100 the cycle. The results are shown in Table 2 below.

TABLE 2

| Battery | Addition amount of oxalic acid (wt. %) | | Capacity retention rate of battery (%) | | |
|---|---|---|---|---|---|
| | Positive electrode plate | Negative electrode plate | 1st cycle | 30th cycle | 100th cycle |
| Sample No. 1 | — | — | 100 | 90 | 71 |
| Sample No. 2 | — | 0.05 | " | 91 | 83 |
| Sample No. 3 | — | 0.1 | " | 96 | 89 |
| Sample No. 4 | — | 3 | " | 95 | 88 |
| Sample No. 5 | — | 10 | " | 92 | 85 |
| Sample No. 6 | — | 12 | " | 90 | 81 |
| Sample No. 7 | 0.05 | — | " | 95 | 81 |
| Sample No. 8 | 0.05 | 0.05 | " | 96 | 85 |
| Sample No. 9 | 0.05 | 0.1 | " | 97 | 88 |
| Sample No. 10 | 0.05 | 3 | " | 94 | 84 |
| Sample No. 11 | 0.05 | 10 | " | 91 | 83 |
| Sample No. 12 | 0.05 | 12 | " | 90 | 81 |
| Sample No. 13 | 0.1 | — | " | 96 | 88 |
| Sample No. 14 | 0.1 | 0.05 | " | 96 | 87 |
| Sample No. 15 | 0.1 | 0.1 | " | 99 | 94 |
| Sample No. 16 | 0.1 | 3 | " | 98 | 93 |
| Sample No. 17 | 0.1 | 10 | " | 97 | 92 |
| Sample No. 18 | 0.1 | 12 | " | 93 | 85 |

TABLE 2-continued

| Battery | Addition amount of oxalic acid (wt. %) | | Capacity retention rate of battery (%) | | |
|---|---|---|---|---|---|
| | Positive electrode plate | Negative electrode plate | 1st cycle | 30th cycle | 100th cycle |
| Sample No. 19 | 3 | — | " | 95 | 79 |
| Sample No. 20 | 3 | 0.05 | " | 95 | 88 |
| Sample No. 21 | 3 | 0.1 | " | 99 | 96 |
| Sample No. 22 | 3 | 3 | " | 98 | 95 |
| Sample No. 23 | 3 | 10 | " | 97 | 96 |
| Sample No. 24 | 3 | 12 | " | 94 | 84 |
| Sample No. 25 | 10 | — | " | 92 | 79 |
| Sample No. 26 | 10 | 0.05 | " | 93 | 89 |
| Sample No. 27 | 10 | 0.1 | " | 97 | 92 |
| Sample No. 28 | 10 | 3 | " | 99 | 93 |
| Sample No. 29 | 10 | 10 | " | 98 | 92 |
| Sample No. 30 | 10 | 12 | " | 85 | 85 |
| Sample No. 31 | 12 | — | " | 95 | 71 |
| Sample No. 32 | 12 | 0.05 | " | 93 | 79 |
| Sample No. 33 | 12 | 0.1 | " | 91 | 84 |
| Sample No. 34 | 12 | 3 | " | 90 | 70 |
| Sample No. 35 | 12 | 10 | " | 88 | 74 |
| Sample No. 36 | 12 | 12 | " | 86 | 68 |

(The capacity at the 1st cycle is set at 100 at each sample)

As is clear from the capacity retention rate at the 100th cycle shown in Table 1, the capacity retention rate of sample No. 1 using a conventional positive electrode plate and negative electrode plate is only 71%, whereas, in respect with the samples No.2 to No. 36 in which either/both of the conventional positive electrode plate or/and negative electrode plate is/are replaced by a positive electrode plate or/and a negative electrode plate of the present invention, in other words, where the amount of oxalic acid is 0.05% or more, the retention rates thereof are more than 80%, and the decreasing rates of the battery capacities involved in the increase of the charge-discharge cycles become remarkably smaller, large in battery capacities and improved in the charge-discharge cycle characteristics when using the positive electrode plate and/or the negative electrode plate where the active material mixture agent contains oxalic acid.

Especially, where the amount of oxalic acid is 0.2–10 wt. %, the batteries exhibits a capacity retention rate of 90% or more at the 100th cycle and it is remarkably effective for the improvement of the charge-discharge cycle characteristics.

Further, since the improvement effect on the cycle characteristics is not obtained on some occasions when the addition amount oxalic acid is 12 wt. %, it is optimum that the addition amount thereof is 0.1–10 wt. % in order to assuredly obtain the remarkable improved effect on the cycle characteristics.

Thus, according to the present invention, in the process of producing an electrode plate, since the electrode plate is produced by coating a coating slurry of the active material mixture agent with added oxalic acid on a collector, when the electrode plate is used as a positive electrode or/and a negative electrode of a lithium secondary battery, a battery is obtained which is improved in the charge-discharge cycle characteristics, that is, improved in the capacity retention rate of the battery as compared with a conventional lithium secondary battery. In the case where the oxalic acid is added in the range of 0.1–10 wt. % based on the active material mixture agent, the improvement in the above-mentioned battery characteristics is even more remarkable.

What is claimed is:

1. A method of producing an electrode plate for use in a lithium secondary battery comprising applying a coating slurry on a collector to form a coating thereon, said coating slurry including an active material mixture agent and oxalic acid added thereto, and pressing the coating, wherein the amount of oxalic acid in the coating slurry is 0.05–10 wt. % based on the active material mixture agent.

2. A lithium secondary battery comprising a positive electrode and a negative electrode, at least one of the positive electrode and the negative electrode prepared by applying a coating slurry on a collector to form a coating thereon, said coating slurry including an active material mixture agent and oxalic acid added thereto, and pressing the coating wherein the amount of oxalic acid in the coating slurry is 0.05–10 wt. % based on the active material mixture agent.

* * * * *